United States Patent
Aaltonen et al.

(10) Patent No.: US 11,952,544 B2
(45) Date of Patent: Apr. 9, 2024

(54) METHOD FOR PROCESSING LIQUEFIED WASTE POLYMERS

(71) Applicant: Neste Oyj, Espoo (FI)

(72) Inventors: Heikki Aaltonen, Porvoo (FI); Antti Ojala, Porvoo (FI); Ville Paasikallio, Porvoo (FI); Antti Kurkijärvi, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 18/259,805

(22) PCT Filed: Oct. 28, 2021

(86) PCT No.: PCT/FI2021/050729
§ 371 (c)(1),
(2) Date: Jun. 29, 2023

(87) PCT Pub. No.: WO2022/144490
PCT Pub. Date: Jul. 7, 2022

(65) Prior Publication Data
US 2024/0034946 A1    Feb. 1, 2024

(30) Foreign Application Priority Data
Dec. 30, 2020    (FI) .................................... 20206384

(51) Int. Cl.
*C10G 65/12*    (2006.01)
*B01D 3/14*    (2006.01)
(Continued)

(52) U.S. Cl.
CPC .............. *C10G 65/12* (2013.01); *B01D 3/14* (2013.01); *B01J 23/882* (2013.01); *B01J 23/883* (2013.01)

(58) Field of Classification Search
CPC ....... C10G 65/12; B01J 23/882; B01J 23/883; B01D 3/14
See application file for complete search history.

(56) References Cited

U.S. PATENT DOCUMENTS 5,849,964 A    12/1998    Holighaus et al.
5,904,838 A    5/1999    Kalnes et al.
(Continued)

FOREIGN PATENT DOCUMENTS

CA    2158032 A1    10/1994
CN    1753976 A    3/2006
(Continued)

OTHER PUBLICATIONS

Notification of the First Office Action) dated Aug. 1, 2023, by the Chinese Patent Office in corresponding Chinese Patent Application No. 202180066139.4, and an English Translation of the Office Action. (11 pages).
(Continued)

*Primary Examiner* — Brian A McCaig
(74) *Attorney, Agent, or Firm* — BUCHANAN INGERSOLL & ROONEY PC

(57) ABSTRACT

The present disclosure relates to methods for processing liquefied waste polymers containing diolefins and naphtha. Hydrotreatment A of the diolefins produces a diolefin depleted LWP feed which is separated by distillation B to give rise to one or more distillates containing at least a naphtha fraction, an optional middle fraction and a distillation bottom. Hydroprocessing C of the naphtha fraction gives rise to hydrogenated naphtha fraction which is suitable
(Continued)

as a feed for a steam cracker D. The distillation bottom and the middle fraction can mixed with crude oil and used in oil refinerery since they are predominantly free from diolefins.

17 Claims, 1 Drawing Sheet

(51) Int. Cl.
   *B01J 23/882* (2006.01)
   *B01J 23/883* (2006.01)

(56) References Cited

U.S. PATENT DOCUMENTS

| | | | |
|---|---|---|---|
| 6,143,940 | A | 11/2000 | Miller et al. |
| 6,822,126 | B2 | 11/2004 | Miller |
| 6,881,324 | B2 | 4/2005 | Smith |
| 7,125,484 | B2 | 10/2006 | Smith |
| 10,233,395 | B2 | 3/2019 | Ward et al. |
| 10,472,580 | B2 | 11/2019 | Al-Ghamdi et al. |
| 10,513,661 | B2 | 12/2019 | Narayanaswamy et al. |
| 10,717,936 | B2 | 7/2020 | Stanislaus et al. |
| 10,760,012 | B2 | 9/2020 | Al-Ghamdi et al. |
| 10,908,896 | B2 | 2/2021 | Lang et al. |
| 2003/0230518 | A1 | 12/2003 | Smith |
| 2005/0040079 | A1 | 2/2005 | Smith |
| 2016/0264874 | A1 | 9/2016 | Narayanaswamy et al. |
| 2016/0264885 | A1 | 9/2016 | Narayanaswamy et al. |
| 2016/0362609 | A1 | 12/2016 | Ward et al. |
| 2017/0044465 | A1 | 2/2017 | Scheibel et al. |
| 2018/0155638 | A1 | 6/2018 | Al-Ghamdi et al. |
| 2019/0161683 | A1 | 5/2019 | Narayanaswamy et al. |
| 2019/0177626 | A1 | 6/2019 | Ramamurthy et al. |
| 2019/0233744 | A1 | 8/2019 | Narayanaswamy et al. |
| 2019/0241838 | A1 | 8/2019 | Scheibel et al. |
| 2019/0299491 | A1 | 10/2019 | Stanislaus et al. |
| 2020/0115642 | A1 | 4/2020 | Al-Ghamdi et al. |
| 2021/0108154 | A1 | 4/2021 | Scheibel et al. |
| 2023/0392084 | A1 | 12/2023 | Aalto et al. |

FOREIGN PATENT DOCUMENTS

| | | | |
|---|---|---|---|
| CN | 105001910 | A | 10/2015 |
| CN | 106164223 | A | 11/2016 |
| CN | 107922853 | A | 4/2018 |
| CN | 109563413 | A | 4/2019 |
| CN | 110088248 | A | 8/2019 |
| JP | H1161147 | A | 3/1999 |
| JP | 2009242555 | A | 10/2009 |
| JP | 2014105246 | A | 6/2014 |
| JP | 2019527758 | A | 10/2019 |
| JP | 2019533041 | A | 11/2019 |
| WO | 2016142808 | A1 | 9/2016 |
| WO | 2016142809 | A1 | 9/2016 |
| WO | 2018025104 | A1 | 2/2018 |
| WO | 2018055555 | A1 | 3/2018 |
| WO | 2018104443 | A1 | 6/2018 |
| WO | 2020008050 | A1 | 1/2020 |
| WO | 2020020769 | A1 | 1/2020 |
| WO | 2020239729 | A1 | 12/2020 |

OTHER PUBLICATIONS

Office Action dated Aug. 21, 2023, by the Korean Patent Office in corresponding Korean Patent Application No. 10-2023-7010590, and an English Translation of the Office Action. (10 pages).
Communication of Acceptance—section 29a of Patents Decree dated Nov. 3, 2022 by the Finnish Patent and Registration Office in corresponding Finnish Patent Application No. 20206385. (3 pages).
Costa, G.A., et al., "Fractionation of tire pyrolysis oil into a light fuel fraction by steam distillation", Fuel, Dec. 21, 2018, vol. 2441, pp. 558-563, Elsevier Ltd. (2 pages).
Dębek, C., et al. "Hydrorefining of oil from pyrolysis of whole tyres for passenger cars and vans", In: Fuel, Jul. 8, 2015, vol. 159, pp. 659-665. (7 pages).
Finnish Search Report dated Jun. 23, 2021, issued in Finnish Patent Application No. 20206384. (2 pages).
International Search Report (PCT/ISA/210) and Written Opinion (PCT/ISA/237) dated Jan. 28, 2022 by the European Patent Office as the International Searching Authority for International Application No. PCT/FI2021/050732. (10 pages).
International Search Report (PCT/ISA/210) and Written Opinion (PCT/ISA/237) dated Jan. 28, 2022, by the European Patent Office as the International Searching Authority for International Application No. PCT/FI2021/050729. (10 pages).
Search Report dated Jun. 23, 2021 issued by the Finnish Patent and Registration Office in corresponding Finnish Patent Application No. 20206385. (2 pages).
Tsaneva, T., et al., "Is It Possible to Upgrade the Waste Tyre Pyrolysis Oil to Finished Marketable Fuels?", In: Petroleum & Coal, Dec. 19, 2015, vol. 57, No. 6, pp. 676-686. (11 pages).
Communication of Acceptance—section 29a of Patents Decree dated Nov. 3, 2022 by the Finnish Patent and Registration Office in corresponding Finnish Patent Application No. 20206384. (3 pages).
Notification of Preliminary Rejection Reasons dated Jun. 16, 2023 for Korean Patent Application No. 10-2023-7010589.
HÁJEKOVÁ et al., "Copyrolysis of Naphtha with Polyalkene Cracking Products; the Influence of Polyalkene Mixtures Composition on Product Distribution", Journal of Analytical and Applied Pyrolysis, 2007, pp. 196-204, vol. 79, No. 1-2.
https://www.oiltanking.com/en/news-info/glossary/naphtha.html (2015).
Scheirs, "Overview of Commercial Pyrolysis Processes for Waste Plastics" Feedstock Recycling and Pyrolysis of Waste Plastics: Converting Waste Plastics Into Diesel and Other Fuels, 2006, pp. 381-433.
Office Action dated Oct. 13, 2023, by the Finnish Patent Office in corresponding Finnish U.S. Appl. No. 20/206,384. (32 pages).
Office Action dated Oct. 31, 2023, by the Finnish Patent Office in corresponding Finnish Patent Application No. 20206385. (32 pages).
Office Action dated Nov. 22, 2023, by the U.S. Patent and Trademark Office in U.S. Appl. No. 18/259,794.
Office Action (Notice of Reasons for Refusal) dated Dec. 5, 2023, by the Japanese Patent Office in corresponding Japanese Patent Application No. 2023-539372, and a machine English Translation of the Office Action. (4 pages).
Office Action dated Jan. 10, 2024, by the Chinese Patent Office in corresponding Chinese Patent Application No. 202180083410.5. (11 pages).

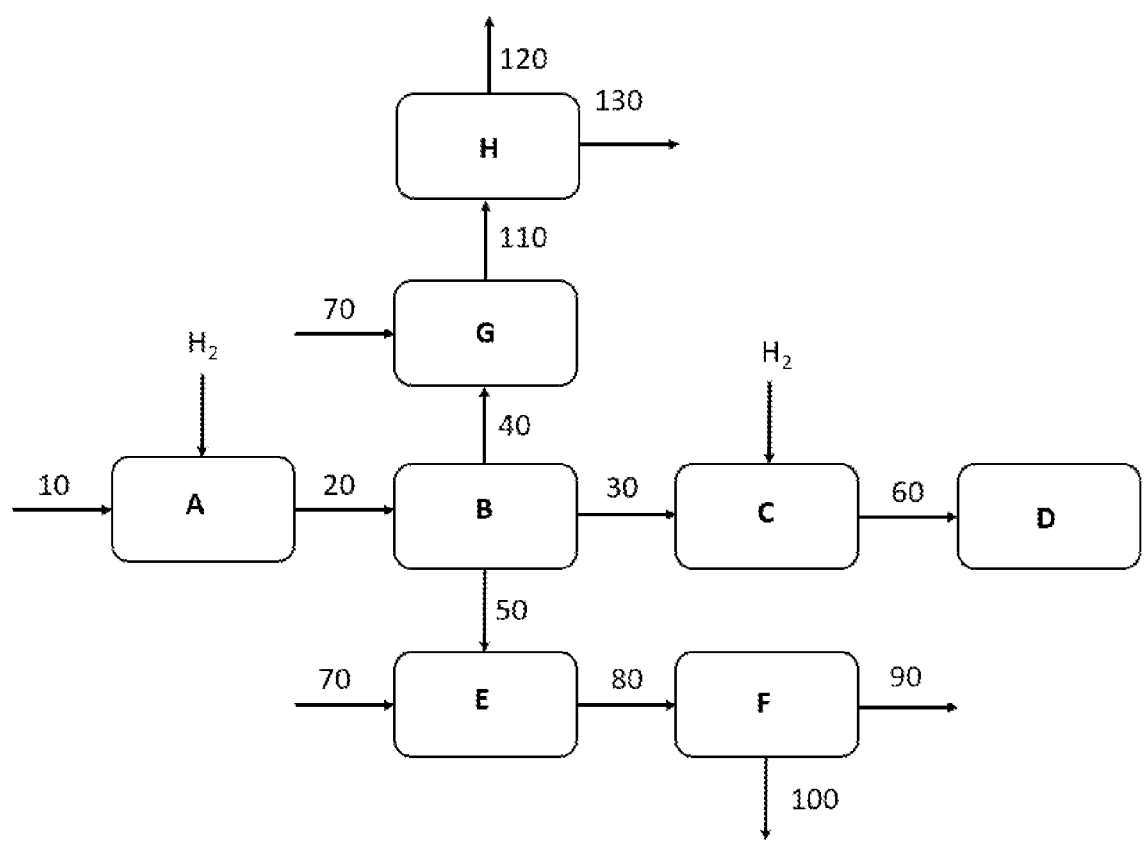

METHOD FOR PROCESSING LIQUEFIED WASTE POLYMERS

FIELD

The present invention relates to methods for processing liquefied waste polymers, in particular to methods comprising selective hydrogenation of diolefins present therein.

BACKGROUND

Processing of liquefied waste polymers (LWP), such as waste plastic pyrolysis oils (WPPO) and hydrothermally liquefied waste plastic oils using oil distillation units is not straightforward. LWPs foul easily and comprise different components of very wide boiling point. In crude oil distillation units, the distillation would be feasible, but products from the crude oil distillation units are typically directed to units that are not designed for olefinic feeds. For example, diolefins present in LWPs may cause problems in hydrogenation processes designed for crude oil derived naphtha fractions which do not include these components.

LWPs contain also different elemental impurities dependent mostly on the source of the polymer waste that is liquefied, but also on the liquefaction technology employed. For example, in post-consumer waste plastics (recycled consumer plastics), that has been identified as a potential large-scale source for polymer waste, the most relevant impurities are nitrogen, oxygen, sulphur and chlorine, but also other halogens such as bromine and fluorine may be present. Bromine-containing impurities may be contained mainly in industry-derived polymer waste (e.g. originating from flame retardants). Furthermore, metals and other impurities, such as metalloids originating from additives and contaminations can also be detected in LWPs. These impurities have a detrimental effect on the direct utilization of the LWPs. LWPs that are produced by a pyrolysis process or hydrothermal liquefaction usually contain significant amounts of olefins and aromatics, each of which may lead to problems in some downstream processes, such as polymerization (or coking) at elevated temperatures.

U.S. Pat. No. 5,849,964 discloses a method for processing used or waste plastic materials to recover chemical raw materials and liquid fuel components by depolymerization of the used materials, which are transformed into a pumpable and into a volatile phase.

The pumpable phase remaining once the volatile phase is separated is subjected to liquid phase hydrogenation, gasification, low temperature carbonization or to a combination of said processes.

WO2016142808 discloses an integrated process for conversion of waste plastics to final petrochemical products. The process allows for operating with a hydroprocessing reaction which provides simultaneous hydrogenation, and dechlorination of components of a hydrocarbon stream to specifications which meet steam cracker requirements.

However, there is still a need for further methods for processing waste polymers.

SUMMARY

The following presents a simplified summary in order to provide a basic understanding of some aspects of various embodiments of the invention. The summary is not an extensive overview of the invention. It is neither intended to identify key nor critical elements of the invention, nor to delineate the scope of the invention. The following summary merely presents some concepts of the invention in a simplified form as a prelude to a more detailed description of exemplifying embodiments of the invention.

It was observed that when LWPs are hydrotreated prior to fractionating, their fouling tendency is significantly reduced. Furthermore, hydroprocessing of the resulting naphtha fraction is easier, and the lifetime of the hydroprocessing catalyst used is longer, as there is less polymerization and other reactions which would result in blocking of the catalysis bed.

In accordance with the invention, there is provided a new method for processing liquefied waste polymers (LWP), wherein the method comprises following steps:
  a) providing an LWP stream comprising diolefins and naphtha,
  b) subjecting the LWP stream to hydrotreatment reaction conditions in the presence of hydrogen and one or more hydrotreatment catalyst to produce diolefin depleted LWP stream, and
  c) distilling the diolefin depleted LWP stream to obtain one or more distillates comprising at least a naphtha fraction boiling below 180° C. at atmospheric pressure and a distillation bottom.

In accordance with the invention, there is also provided a new use of hydrogenated naphtha as steam cracker feed wherein the hydrogenated naphtha is produced by a method comprising:
  a) providing an LWP stream comprising diolefins and naphtha,
  b) subjecting the LWP stream to hydrotreatment reaction conditions in the presence of hydrogen and one or more hydrotreatment catalysts to produce diolefin depleted LWP stream,
  c) distilling the diolefin depleted LWP stream to obtain one or more distillates comprising at least a naphtha fraction boiling below 180° C. at atmospheric pressure and a distillation bottom and
  d) subjecting the naphtha fraction to hydroprocessing reaction conditions in the presence of hydrogen and one or more hydroprocessing catalysts.

In accordance with the invention there is also provided a new use of a mixture of crude oil and the distillation bottom of step c) as a crude oil refinery feed.

A number of exemplifying and non-limiting embodiments of the invention are described in accompanied dependent claims.

Various exemplifying and non-limiting embodiments of the invention and to methods of operation, together with additional objects and advantages thereof, are best understood from the following description of specific exemplifying embodiments when read in connection with the accompanying FIGURES.

The verbs "to comprise" and "to include" are used in this document as open limitations that neither exclude nor require the existence of also unrecited features. The features recited in depending claims are mutually freely combinable unless otherwise explicitly stated. Furthermore, it is to be understood that the use of "a" or "an", i.e., a singular form, throughout this document does not exclude a plurality.

As definer herein, the "hydroprocessing" refers to a range of catalytic chemical engineer processes, including hydrotreating and hydrocracking, in which the reaction of hydrogen is used to remove impurities, such as oxygen, sulphur, nitrogen, phosphorous, silicon and metals, to saturate carbon-carbon bonds, to break carbon-carbon bonds, to reduce average molecular weight, to rearrange the molecular structure of the feed or any combination thereof.

As definer herein, the term "hydrotreating" refers to a chemical engineer process in which the reaction of hydrogen is used to remove impurities, such as oxygen, sulphur, nitrogen, phosphorous, silicon and metals, and/or to saturate carbon-carbon bonds, especially as part of oil refining.

Hydrotreating can be performed in one or several steps in one or more reactor units or catalyst beds.

BRIEF DESCRIPTION OF FIGURES

The exemplifying and non-limiting embodiments of the invention and their advantages are explained in greater detail below with reference to the accompanying FIGURE, which shows an exemplary non-limiting flow chart for processing liquefied waste polymers 10 comprising diolefins.

DESCRIPTION

The present invention concerns a method for processing liquefied waste polymers (LWP). The principle of the method is shown in FIG. 1. Accordingly, an LWP stream 10 comprising diolefins and naphtha is fed to a hydrotreatment unit A to produce diolefin depleted LWP stream 20. When the hydrotreatment reaction is performed in mild, preferably in liquid phase conditions, in the presence of hydrogen and one or more hydrotreatment catalysts known in the art, predominantly only the diolefins present in the LWP are reduced. Exemplary hydrotreatment reaction conditions for selective reduction of diolefins comprise temperature 120-210° C. and pressure 1-50 barg. An exemplary pressure is 28.5 barg. Liquid hourly space velocity (LHSV) is typically 1-5 $h^{-1}$, preferably 4-4.5 $h^{-1}$. An exemplary hydrogen/hydrocarbon ratio is 15 N $m^3/m^3$. Exemplary hydrotreatment catalysts include NiMo and CoMo, preferably on a support. An exemplary hydrotreatment catalyst is NiMo/$Al_2O_3$. Another exemplary hydrotreatment catalyst is CoMo/$Al_2O_3$.

The diolefin depleted LWP stream is fed to a distillation unit B, wherein one or more distillates 30, 40 and a distillation bottom 50 are separated. According to one embodiment the distillate comprises a naphtha fraction 30 boiling below 180° C. at atmospheric pressure. According to this embodiment the distillation bottom 50 comprises material boiling above 180° C. at atmospheric pressure.

According another embodiment the distillation produces two distillates namely a naphtha fraction 30 boiling below 180° C. at atmospheric pressure, and a middle distillate 40 boiling between 180° C. and 360° C. at atmospheric pressure. According to this embodiment the distillation bottom 50 comprises material boiling above 360° C. at atmospheric pressure.

According to one embodiment the distillation is performed at atmospheric pressure. According to another embodiment the distillation is performed at reduced pressure. According to still another embodiment the distillation is performed at excess pressure.

According to a preferable embodiment the naphtha fraction 30 is fed to a hydroprocessing unit C. The hydroprocessing is performed preferably with NiMo- and CoMo-type catalysts which remove heteroatoms such as chlorine, oxygen, sulphur and nitrogen in the naphtha fraction and simultaneously carries out hydrogenation of olefins and aromatics present therein. The hydroprocessing of naphtha is performed typically in gas phase in elevated temperature and pressure in the presence of hydrogen. Exemplary hydroprocessing reaction conditions comprise temperature 280-350° C. and pressure 20-100 barg preferably 20-50 barg. LHSV is typically 1-5 $h^{-1}$, and hydrogen/hydrocarbon ratio 100-900 $Nm^3/m^3$ such as 360 $Nm^3/m^3$. Exemplary non-limiting hydroprocessing catalysts are CoMo/$Al_2O_3$ and NiMo/$Al_2O_3$. The product is a hydrogenated naphtha fraction 60.

It is known that steam crackers have specifications for olefinic, aromatic and heteroatom content of the feed. Accordingly, the hydrogenated naphtha fraction 60 is suitable as a feed of steam cracker D.

LWPs can be co-processed with crude oil in an oil refinery. However, as the products from crude oil distillation units are typically directed to units that are not designed for olefinic feeds, the absence of olefinic components, and in particular diolefins, would be beneficial. The aforementioned limitation is particularly relevant in the context of naphtha hydroprocessing units which are designed for the processing of straight run naphtha. Such units typically operate in gas phase, and the overall exotherm, i.e. temperature increase which occurs inside the reactor due to heat released by the chemical reactions, is limited. Adding an olefinic feed to such a reactor can result in a substantial increase in the overall exotherm, which may in turn shorten the lifetime of the hydroprocessing catalyst. Thus, removing the naphtha fraction from LWP prior to co-processing at the refinery is beneficial also from the refinery perspective. Co-processing of the heavier LWP fractions at the refinery is less problematic compared to the naphtha fraction, as hydroprocessing units which designed for middle distillates and e.g., heavy gas oil or vacuum gas oil are otherwise also used for processing thermally cracked feeds from e.g., visbreaking or delayed coking units.

According to a particular embodiment the bottom fraction 50 is admixed with crude oil 70 e.g., in a mixing unit E to form an admixture 80 which is then fed to a crude oil distillation unit F where the admixture is separated to one or more streams 90, 100.

According to another embodiment the middle fraction 40 is admixed with crude oil 70 e.g., in a mixing unit G to form an admixture 110 which is then fed to a crude oil distillation unit H where the admixture is separated to one or more streams 120, 130.

According to another embodiment the present invention concerns use of hydrogenated naphtha produced from LWP comprising diolefins as a steam cracker feed. The steam cracker feed is produced by a method comprising the following steps:
 a) providing an LWP stream comprising diolefins and naphtha,
 b) subjecting the LWP stream to hydrogenation reaction conditions to produce diolefin depleted LWP stream,
 c) distilling the diolefin depleted LWP stream to obtain at least one naphtha fraction boiling below 180° C. at atmospheric pressure and a distillation bottom, and
 d) subjecting the naphtha fraction to hydrogenation reaction conditions to produce hydrogenated naphtha.

The method of the present invention is suitable for processing different type of liquefied waste polymers and their mixtures such as waste plastic pyrolysis oils (WPPO) and hydrothermally liquefied waste plastic oils. According to one embodiment the liquefied waste polymers comprises WPPO. According to another embodiment the liquefied waste polymers comprises hydrothermally liquefied waste plastic oils.

The specific examples provided in the description given above should not be construed as limiting the scope and/or the applicability of the appended claims.

What is claimed is:

1. A method for processing liquefied waste polymers (LWP), the method comprising the following steps:
   a) providing a LWP stream containing diolefins and naphtha;
   b) subjecting the LWP stream to hydrotreatment reaction conditions in a presence of hydrogen and one or more hydrotreatment catalyst to produce diolefin depleted LWP stream, wherein the hydrotreatment reaction conditions include temperature 120-210° C. and pressure 1-50 barg;
   c) distilling the diolefin depleted LWP stream to obtain one or more distillates including at least a naphtha fraction boiling below 180° C. at atmospheric pressure and a distillation bottom; and
   d) subjecting the naphtha fraction of step c) to hydroprocessing reaction conditions in a presence of hydrogen and one or more hydroprocessing catalysts to produce hydrogenated naphtha.

2. The method according to claim 1, wherein the hydrotreatment reaction conditions comprise:
   a LHSV between 1-5 $h^{-1}$.

3. The method according to claim 2, wherein the hydrotreatment reaction conditions comprise a LHSV between 4-4.5 $h^{-1}$.

4. The method according to claim 1, wherein the one or more hydrotreatment catalysts are selected from CoMo and NiMo.

5. The method according to claim 1, wherein the hydroprocessing reaction conditions of step d) comprise:
   a temperature between 280-350° C. and pressure between 20-100 barg.

6. The method according to claim 5, wherein the hydroprocessing reaction conditions comprise:
   LHSV 1-5 $h^{-1}$, and hydrogen/hydrocarbon ratio 100-900 $Nm^3/m^3$.

7. The method according to claim 5, wherein the hydroprocessing reaction conditions of step d) comprise: pressure between 20-50 barg.

8. The method according to claim 1, wherein the one or more hydroprocessing catalysts are selected from CoMo and NiMo.

9. The method according to claim 1, comprising:
   feeding the hydrogenated naphtha to a steam cracker.

10. The method according to claim 1, comprising:
    admixing the distillation bottom and crude oil to form an admixture.

11. The method according to claim 10, comprising:
    feeding the admixture to a crude oil distillation unit.

12. The method according to claim 1, wherein the one or more distillates comprise:
    a middle fraction boiling between 180° C. and 360° C. at atmospheric pressure.

13. The method according to claim 12, comprising:
    feeding the middle fraction to a crude oil distillation unit.

14. The method according to claim 12, comprising:
    feeding a mixture of crude oil and the middle fraction to a crude oil refinery.

15. The method according to claim 1, wherein the LWP is selected from waste plastic pyrolysis oil and hydrothermally liquefied waste plastic oil or mixtures thereof.

16. The method according to claim 1, wherein the LWP comprises:
    waste plastic pyrolysis oil.

17. The method according to claim 1, comprising: feeding a mixture of crude oil and the distillation bottom of step c) to a crude oil refinery.

* * * * *